(12) United States Patent
Zapf

(10) Patent No.: US 8,796,382 B2
(45) Date of Patent: Aug. 5, 2014

(54) TWO-COMPONENT STRUCTURE ADHESIVE FOR THE ADHERING OF RARE EARTH MAGNETS

(75) Inventor: Lothar Zapf, Alzenau (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 1233 days.

(21) Appl. No.: 12/423,646

(22) Filed: Apr. 14, 2009

(65) Prior Publication Data

US 2009/0261932 A1   Oct. 22, 2009

(30) Foreign Application Priority Data

Apr. 17, 2008 (DE) .......................... 10 2008 019 196

(51) Int. Cl.
*C08L 71/00* (2006.01)
*C08L 33/12* (2006.01)

(52) U.S. Cl.
USPC ............ 525/132; 525/390; 355/302; 156/310

(58) Field of Classification Search
USPC ..................... 335/302; 525/390, 132; 156/310
See application file for complete search history.

(56) References Cited

U.S. PATENT DOCUMENTS

| | | | | |
|---|---|---|---|---|
| 3,862,920 A * | 1/1975 | Foster et al. | ................... | 523/116 |
| 4,675,433 A | 6/1987 | Ritter | | |
| 6,734,249 B1 * | 5/2004 | Bulluck et al. | ................ | 524/558 |
| 7,014,790 B1 | 3/2006 | Bulluck et al. | | |
| 2002/0084019 A1 * | 7/2002 | Date et al. | ..................... | 156/206 |
| 2003/0216513 A1 | 11/2003 | Righettini et al. | | |

FOREIGN PATENT DOCUMENTS

| | | |
|---|---|---|
| DE | 3204504 A1 | 8/1983 |
| EP | 0 245 559 | 11/1987 |
| EP | 0245559 | 11/1987 |
| EP | 0 982 385 | 3/2000 |
| WO | WO 2008/014466 | 1/2008 |
| WO | WO 2008/014466 A2 | 1/2008 |

OTHER PUBLICATIONS

Office Action dated Oct. 13, 2008 issued by German Patent Office.
Search Report Under Section 17 issued by the Great Britain Patent Office on Sep. 29, 2009 for Great Britain Application No. GB0906593.9.
Search Report Under Section 17 issued by the French Patent Office on Sep. 19, 2012 for French Application No. 0952328.
Search Report Under Section 17 issued by the German Patent and Trademark Office on Sep. 27, 2012 for German Application No. 10 2008 019 196.5.
Wiley-Vch "Klebtechnik" published online Dec. 23, 2005; W. Brockman, P.L. Geiβ, J. Klingen, B. Schroder.

* cited by examiner

*Primary Examiner* — Robert D. Harlan
(74) *Attorney, Agent, or Firm* — Dickinson Wright PLLC

(57) ABSTRACT

Disclosed herein is a two-component structural adhesive based on organic compounds containing radically polymerizable multiple bonds, in particular substituted acrylates and/or methacrylates, which on account of their lack of acids are particularly suited for adhering rare earth permanent magnets based on neodymium-iron-boron.

25 Claims, No Drawings

TWO-COMPONENT STRUCTURE ADHESIVE FOR THE ADHERING OF RARE EARTH MAGNETS

BACKGROUND

1. Field

Disclosed herein is a two-component structural adhesive composition based on organic compounds containing radically polymerizable multiple bonds, and an adhesive formed therefrom, and method for providing bonding between a rare earth permanent magnet and a substrate.

2. Description of Related Art

The construction of magnet systems from rare earth permanent magnets frequently requires adhering multiple magnets to one another or to support parts, for example magnetic yokes, particular demands being placed on the adhesive system due to the chemical and physical properties of the magnets.

Rare earth permanent magnets, in particular those made of neodymium-iron-boron, are highly susceptible to corrosion under the effect of humidity or condensation. For neodymium-iron-boron materials, moisture results in planar formation of rust on the magnet surface ("red corrosion"). In addition, the neodymium-rich phase is attacked, this attack being particularly dramatic due to the fact that the neodymium-rich phase in the crystal structure performs the function of a mechanical binder between the magnetic particles. As a result of this so-called "white corrosion," the magnet decomposes into a grayish-white powder. The corrosion of the neodymium-rich phase is associated with the uptake of hydrogen and formation of neodymium hydride, which further accelerates the spread of the white corrosion. Water uptake occurs through reaction with ambient moisture (humidity, condensation), and is relatively slow at room temperature. At elevated temperatures, for example 80° C. and higher, the reaction proceeds at an appreciable rate. In both cases the corrosion is significantly accelerated in the presence of acids. Thus, at room temperature the reaction rate is relatively high for white as well as red corrosion, and within a few weeks may result in destruction of the magnet. Therefore, acid-free adhesive systems are required for designing magnet systems composed of rare earth permanent magnets.

Furthermore, for the manufacture of magnet systems using adhesion, in particular when the magnets are installed in the magnetized state, the use of rapid-set adhesive systems is advantageous since use of complicated holding devices until the adhesive is cured may be avoided, and mass production assembly may be carried out quickly and reliably using pick-and-place machines and automated adhesive machines. For many magnet systems, such as rotors for electric motors and generators, for example, multiple magnets must be placed directly adjacent to one another, and it is essential to achieve reliable curing of the adhesive to a minimum strength in a short period of time in order to prevent slippage or separation of the magnets due to magnetic forces of attraction or repulsion. The aim is to achieve sufficient curing with a minimum adhesion shear strength of 0.5-1.0 N/mm$^2$ in less than two minutes, in order to allow reliable fitting of the system carrier parts with magnetized magnets.

A further important requirement imposed on the adhesive system used is thermal resistance of the adhesion under typical operating conditions of the magnet systems, which for use of motors, for example, means a thermal load of up to 150° C. In addition, the magnet adhesion should absorb stresses which act on the adhesive during curing or for temperature fluctuations, for example as the result of differences in the thermal expansion coefficients of the adhered materials, thereby preventing cracks or impaired adhesion in the adhesive film.

Various adhesive systems are known for adhering materials, in particular rare earth permanent magnets. For example, cyanoacrylate adhesives, also known as "instant adhesives," are known which thus easily meet the criterion of rapid curing and setting. A disadvantage of cyanoacrylate adhesives is that they must be processed in a climatized adhesion room having a defined humidity. A further disadvantage of these adhesives is that the adhesions do not have long-term resistance under load. Furthermore, the adhesions are sensitive to moisture and the adhesive itself is relatively brittle, as the result of which the adhesive strength decreases markedly after temperature fluctuations. Such adhesives may generally be used only up to an operating temperature of 80° C.

Heat-curing epoxy resin systems, which have high strength and resistance, are widely used for adhering workpieces. However, these adhesives must be cured using continuous ovens having residence times of up to one hour, or, for more rapid curing, by the use of complex and costly induction techniques. Such epoxy resin systems are not particularly suitable for adhering electronic components such as rare earth permanent magnets, for example.

The use of two-component structural adhesives based on substituted acrylates or methacrylates has been known for quite some time and is very prevalent. Such adhesives cure very rapidly, and have high mechanical and thermal load capacity. However, the disadvantage of these adhesives is that rapid curing requires more or less high concentrations of acrylic, methacrylic, or other organic acids, such as carboxylic acids, which are used to improve adhesion to the substrates by salt formation, which is associated with release of metal ions which act as accelerators for the curing. Typical acid contents of the two-component structural adhesives are 1 to 10% by weight. This relatively high acid content makes the adhesives unsuitable for direct adhesion of neodymium-iron-boron magnets.

Thus, there remains a need for a magnet adhesive for rare earth permanent magnets which combines lack of acid, thermal resistance, rapid curing, and high strength.

SUMMARY

This need is met by use of a two-component adhesive having the features described herein.

In the embodiments described herein, a two-component structural adhesive based on organic compounds containing radically polymerizable multiple bonds, such as substituted acrylates and/or methacrylates, for example, is used. This two-component adhesive is composed of at least one acid-free component containing a radical initiator and at least one additional acid-free component containing an activator. In contrast to the conventional structural adhesives based on acrylates or methacrylates, the system described herein, i.e., the two components, contains no acids, such as carboxylic acids or other organic acids. Such acidic components are not needed because it has surprisingly been found that the addition of resin or resin mixtures that are based on polymers containing phenol ether groups to one or both of the adhesive composition components achieves a comparable curing acceleration which it was believed could otherwise be accomplished only by the addition or use of acids, such as acrylic acid, methacrylic acid, or other organic acids. In particular phenoxy resins and/or solid epoxy resins of the bisphenol A or bisphenol F series, having an average molecular weight between 2000 and 100,000 g/mol, preferably between 3000 and 50,000 g/mol, are suitable as high-molecular weight polymers containing phenol ether groups.

In a particular embodiment is disclosed a two-component structural adhesive composition, comprising:
(A) a first acid-free component comprising a monomer containing one or more radically polymerizable multiple bonds;
(B) a second acid-free component comprising a radical initiator or a radical activator;
wherein:
the first component further comprises a radical initiator and the second component comprises a radical activator, or the first component further comprises a radical activator and the second component comprises a radical initiator; and
the first component or the second component, or both, further comprise a resin or resin mixture comprising one or more polymers containing phenol-ether groups.

In another particular embodiment is disclosed an adhesive formed by curing the two-component adhesive composition described herein.

In another embodiment is disclosed a rare earth permanent magnet assembly comprising:
a rare earth permanent magnet;
a substrate; and
the adhesive described herein adhering the rare earth permanent magnet to the substrate.

In another embodiment is disclosed a method of adhering a rare earth permanent magnet to a substrate, comprising:
disposing the first acid-free component of the two-component adhesive composition described herein on a first surface of a rare earth permanent magnet or a substrate;
disposing the second acid-free component of the two-component adhesive composition described herein on a second surface of a substrate or a rare earth permanent magnet;
placing the first and second surfaces together; and
curing said adhesive composition to form an adhesive.

The two-part adhesive composition described herein avoids the problems associated with the previous adhesive compositions described above, particularly with respect to the adhesion of rare earth permanent magnets to various substrates, and particularly with respect to the adhesion of rare earth permanent magnets that comprise neodymium, iron, and boron.

DETAILED DESCRIPTION OF SPECIFIC EMBODIMENTS

As used herein, the term "two-component adhesive composition" refers to the composition prior to curing of the monomer containing one or more radically polymerizable multiple bonds. The term "adhesive" refers to the material that results from polymerization of such monomers in the two-component composition. The term "acid-free" indicates that no acid has been added to the component as a reagent, and does not exclude organic acids that may form as the result of dissociation of esterified monomers.

In one particular embodiment of the two-part adhesive composition described herein, a phenoxy resin based on bisphenol A and having an average molecular weight of approximately 30,000 g/mol is used as the resin or resin mixture. In another particular embodiment described herein, a bisphenol A epoxy resin having an average molecular weight of >3000 g/mol is used as the resin or resin mixture.

Alternatively, it is possible to use mixtures of polymers containing the described phenol ether groups as the resin or resin mixture, as well as resin mixtures of the added resins as described herein with other compatible polymers, in particular polymethylmethacrylate and copolymers of methacrylates, and other thermally stable polymers soluble in one or both components of the adhesive. Examples include polysulfones, polyesters, polyurethanes, and the like. The proportion of added resin in the two-part adhesive composition described herein is desirably between 10% by weight to a maximum 80% by weight, and is preferably between 30% by weight and 60% by weight.

By addition of the phenol-ether containing resins based on phenoxy or epoxy compounds, the radical polymerization may be significantly accelerated without addition of acid. Curing times for dryness to the touch, corresponding to a shear strength >0.5 N/mm$^2$ at a temperature of 20° C. to 25° C., may be shortened to 30 to 90 seconds. Thus, at room temperature, curing times are obtained which allow the magnets to be easily adhered to one another or to other substrates without having to use complicated holding devices.

Because of the presence of secondary hydroxyl groups, the added resins according to the invention also act as excellent bonding agents on metallic surfaces such as iron or rare earth materials, for example. A further advantage of the added resins is based on their elastifying effect at elevated temperatures. The phenoxy resins, for example, have a glass transition temperature between 80° C. and 100° C., depending on the resin type. As a result of the thermoplastic characteristics of these resin additives described herein, the adhesive becomes softer and more elastic at higher temperatures, and the overall adhesion has improved characteristics under temperature fluctuations. This has a particularly advantageous effect for adhesions of neodymium-iron-boron-magnets to iron, since the thermal expansion coefficients of these materials differ greatly.

The monomers containing one or more multiple bonds are preferably liquid acrylates or methacrylates. Examples include acrylates and methacrylates of aliphatic alcohols having one or more hydroxyl groups, for example alkanols, such as methanol, ethanol, propanol, or higher alcohols containing longer chain alkyl groups; aryl or aralkyl alcohols containing one or more hydroxyl groups, such as benzyl alcohol; aliphatic and aromatic glycol ethers; polyols, such as glycerin, glycols, non-glycol diols, and others. Each component may contain further additives. Examples include polymers for increasing viscosity, organosilanes (e.g., for improving adhesion), organometallic compounds (e.g., for producing metal ions as curing accelerators), mineral fillers, rheological additives, softeners, solvents, or other auxiliary substances. Polymethylmethacrylates, for example, may be used as polymers for increasing viscosity. One example of a rheological additive is Aerosil fumed silica. In addition, either or both components may contain a film-forming polymer to achieve uniform distribution with respect to the adhesive surface.

The resin or resin mixture described herein can be selected to dissolve in the liquid mixture of the acrylate or methacrylate compound without forming residues, the proportion of resin in the two-part adhesive composition being between 10% by weight and 80% by weight, preferably between 30% by weight and 60% by weight, particularly preferably between 25% by weight and 50% by weight, based upon the total weight of the two-part composition.

The same as for the conventional adhesive compositions, curing of the two-component structural adhesive composition described herein requires a radical initiator, for which purpose an organic peroxide is preferably used. Curing of the two-part adhesive composition also requires an activator, which catalyzes decomposition of the peroxides to radicals, and for which purpose an aromatic amine is preferably used. Advantageous embodiments of the adhesive described herein provide that dibenzoyl peroxide and/or cumene hydroperoxide are used as organic peroxide, whereas N,N-dimethyltoluidine, phenylbutylimine, and/or 3,5-diethyl-1,2-dihydro-1-phenyl-2-propylpyridine may advantageously be used as aromatic amine. A coreagent (e.g., which accelerates the curing reaction), for example saccharine, may be used in addition to the aromatic amine. Additions of Cu salts also have an accelerating effect on the decomposition of peroxide into radicals.

The second acid-free component of the two-component adhesive composition can contain either the initiator or the activator, depending upon whether the first acid-free component contains the activator or initiator. The initiator and activator are kept in separate components until the adhesive composition is used in order to avoid curing the composition and forming the adhesive prematurely. The second acid-free component of the two-component adhesive composition can also desirably contain a suitable solvent. Ketone solvents, such as acetone and methyl ethyl ketone, are particularly suitable.

In one particularly preferred embodiment of the adhesive described herein, the first acid-free component contains approximately 65% by weight of a mixture of methacrylate compounds, approximately 32.5% by weight of a bisphenol A epoxy resin, and approximately 2.5% by weight N,N-dimethyltoluidine, whereas the second acid-free component contains approximately 9% by weight polymethylmethacrylate and approximately 1% by weight dibenzoyl peroxide, which are dissolved in acetone.

In a further particularly preferred embodiment of the two-component adhesive described herein, the first acid-free component contains approximately 60% by weight of a mixture of methacrylate compounds, approximately 36% by weight of a phenoxy resin having a molar mass of 22,000 g/mol, approximately 2% by weight cumene hydroperoxide, and approximately 2% by weight saccharine, whereas second acid-free component contains approximately 1% by weight N,N-dimethyltoluidine dissolved in cyclohexane.

For practical use of the adhesive described herein, the typical procedure is to first apply the second acid-free component to one of the two bonding partners and to allow the solvent to evaporate. The first acid-free component is then applied to a bonding partner, and the bonding partners are immediately joined together and fixed in place. After approximately 30 to 90 seconds the resulting adhesive is dry to the touch.

The use of the two-part adhesive composition described herein is described in detail below with reference to certain non-limiting examples. Examples 1 and 3 demonstrate acceleration of curing using the resin additives described herein, Example 2 provides a comparative example illustrating the result when the resin or resin mixture is omitted, and Example 4 demonstrates in particular the bonding strength and resistance to temperature fluctuations of the adhesion described herein.

EXAMPLE 1

Example 1 demonstrates acceleration of curing by introducing a resin described herein into the first acid-free component of the two-component structural adhesive, using a bisphenol A type of epoxy resin having a molecular weight of 3500 g/mol as resin. The first acid-free component was composed of 30 g methylmethacrylate, 30 g epoxy resin, and 1 g N,N-dimethyl-p-toluidine. The second acid-free component contained 10 g polymethylmethacrylate, 0.5 g dibenzoyl peroxide, and 90 g methyl ethyl ketone as solvent.

The second acid-free component was applied to a sandblasted iron plate, and the solvent was allowed to evaporate. The first acid-free component was then applied to a magnet composed of neodymium-iron-boron in the form of a blank having dimensions of 15×5 mm. The two bonding partners were immediately joined together and the adhesive bond was fixed for 15 seconds. The adhesion was dry to the touch after 90 seconds.

EXAMPLE 2 (COMPARATIVE EXAMPLE)

For Example 2 the same adhesive composition was selected as for Example 1, except that instead of the resin described herein a polymethylacrylate was used as the second polymer. Thus, the first acid-free component was composed of 30 g methylmethacrylate, 30 g polymethylmethacrylate, and 1 g N,N-dimethyl-p-toluidine, whereas the composition of the second acid-free component was unchanged: 10 g polymethylmethacrylate and 0.5 g dibenzoyl peroxide dissolved in 90 g methyl ethyl ketone.

The adhesion was carried out analogously to that in Example 1. Without addition of the resin, initial solidification was observable only after approximately 3 minutes.

EXAMPLE 3

In a further example, the acceleration of curing was demonstrated by introducing in each case a resin described herein into the first acid-free component as well as into the second acid-free component.

The first acid-free component composition from Example 1 was used, containing 30 g methylmethacrylate, 30 g of the bisphenol A type of epoxy resin having a molecular weight of 3500 g/mol, and 1 g N,N-dimethyl-p-toluidine. As the second acid-free component, 10 g phenoxy resin having a molecular weight of 22,000 g/mol and 0.5 g dibenzoyl peroxide dissolved in 90 g methyl ethyl ketone were used.

The adhesion test was conducted the same as for Examples 1 and 2, achieving an adhesion that was dry to the touch after 60 seconds.

EXAMPLE 4

The same adhesive system as for Example 3 was used in Example 4. A sandblasted iron plate having dimensions of 60×40×8 mm and a neodymium-iron-boron-magnet having dimensions of 30×18×5 mm were used as bonding partners. A total of six adhesion samples were prepared, the adhesive surface in each case being 540 mm$^2$.

Three of the six samples were sheared after 24 hours storage at room temperature. The achieved shear strength was 15 to 20 N/mm$^2$. Three additional samples were subjected to temperature fluctuation between −20° C. and 100° C., with a 4-hour temperature cycle comprising 1 hour of cooling to −20° C., 1 hour of storage at −20° C., 1 hour of heating to 100° C., and 1 hour of storage at 100° C. The total test period was 100 cycles. The samples were then sheared, achieving a shear strength of 13 to 18 N/mm$^2$.

The invention having been described with respect to certain non-limiting examples and specific embodiments, it will be appreciated that these examples and embodiments are illustrative, and not limiting of the appended claims.

The invention claimed is:

1. A two-component structural adhesive composition, comprising:

(A) a first acid-free component comprising a monomer containing one or more radically polymerizable multiple bonds;
(B) a second acid-free component comprising a radical initiator or a radical activator;
wherein:
the first component further comprises a radical initiator and the second component comprises a radical activator, or the first component further comprises a radical activator and the second component comprises a radical initiator; and
the first component or the second component, or both, further comprise a resin or resin mixture comprising one or more phenoxy resins of the bisphenol A series, one or more phenoxy resins of the bisphenol F series, one or more solid epoxy resins of the bisphenol A series, one or more solid weight epoxy resins of the bisphenol F series, or mixtures thereof, and having an average molecular weight between 2000 and 100,000 g/mo.

2. The two-component adhesive composition according to claim 1, wherein the resin or resin mixture has an average molecular weight between 3000 and 50,000 g/mol.

3. The two-component adhesive composition according to one of claim 2, wherein the resin or resin mixture comprises a bisphenol A phenoxy resin having an average molecular weight of approximately 30,000 g/mol.

4. The two-component adhesive composition according to claim 1, wherein the resin or resin mixture comprises a bisphenol A epoxy resin having an average molecular weight >3000 g/mol.

5. The two-component adhesive composition according to claim 1, wherein the monomer containing one or more radically polymerizable multiple bonds comprises one or more of:
methacrylates of aliphatic alcohols having one or more hydroxy groups, methacrylates of aromatic alcohols having one or more hydroxyl groups.

6. The two-component adhesive composition according to claim 1, wherein said first acid-free component, or said second acid-free component, or both, further comprise one or more additives selected from the group consisting of viscosity-increasing polymers, organosilanes, curing accelerators, mineral fillers, rheological additives, softeners, and solvents.

7. The two-component adhesive composition according to claim 1, wherein said first acid-free component, or said second acid-free component, or both, further comprises a film-forming polymer.

8. The two-component adhesive composition according to claim 1, wherein resin or resin mixture further comprises one or more polymers compatible with said one or more polymers of phenol-ether monomers, epoxy monomers, or combinations thereof.

9. The two-component adhesive composition according to claim 1, wherein said resin or resin mixture is present in the adhesive in an amount between 10% by weight and 80% by weight of the adhesive.

10. The two-component adhesive composition according to claim 1, wherein the radical initiator comprises an organic peroxide.

11. The two-component adhesive composition according to claim 1, wherein the radical activator comprises an aromatic amine.

12. The two-component adhesive composition according to claim 10, wherein the organic peroxide comprises dibenzoyl peroxide, cumene hydroperoxide, or a combination thereof.

13. The two-component adhesive composition according to claim 11, wherein the aromatic amine is N,N-dimethyltoluidine, phenylbutylimine, 3,5-diethyl-1,2-dihydro-1-phenyl-2-propylpyridine, or a combination thereof.

14. The two-component adhesive composition according to claim 1, wherein said first acid-free component, or said second acid-free component, or both, further comprise a coreagent.

15. The two-component adhesive composition according to claim 1, wherein:
said first acid-free component comprises:
approximately 65% by weight of a mixture of methacrylate compounds,
approximately 32.5% by weight of a bisphenol A epoxy resin, and
approximately 2.5% by weight dimethyltoluidine; and
said second acid-free component comprises:
approximately 9% by weight polymethylmethacrylate,
approximately 1% by weight dibenzoyl peroxide, and acetone.

16. The two-component adhesive composition according to claim 1, wherein:
said first acid-free component comprises:
approximately 60% by weight of a mixture of methacrylate compounds,
approximately 36% by weight of a phenoxy resin having a molecular weight of approximately 22,000 g/mol,
approximately 2% by weight cumene hydroperoxide, and approximately 2% by weight saccharine, and
said second acid-free component comprises:
approximately 1% by weight N,N-dimethyltoluidine, and cyclohexane.

17. An adhesive formed by curing the two-component adhesive composition according to claim 1.

18. The two-component adhesive composition according to claim 5, wherein the aliphatic alcohols comprise alkanols, glycol ethers, or polyols.

19. The two-component adhesive composition according to claim 18, wherein the alkanols comprise methanol, ethanol, or propanol.

20. The two-component adhesive composition according to claim 18, wherein the polyols comprise glycerin or diols.

21. The two-component adhesive composition according to claim 6, wherein said viscosity-increasing polymer comprises polymethylmethacrylate, or said rheological additive is fumed silica, or a combination of these.

22. The two-component adhesive composition according to claim 8, wherein said one or more compatible polymers are selected from the group consisting of polymethylmethacrylates, methacrylate copolymers, polysulfones, polyesters, and polyurethanes.

23. The two-component adhesive composition according to claim 9, wherein the amount of resin is between 30% by weight and 60% by weight of the adhesive composition.

24. The two-component adhesive composition according to claim 14, wherein said coreagent is in the said first acid-free component when said radical activator is present therein, and is in said second acid-free component when said radical activator is present therein.

25. The two-component adhesive composition according to claim 14, wherein said coreagent comprises saccharine.

* * * * *